Nov. 18, 1952

D. J. JORDAN 2,618,324

POWER PLANT GOVERNOR

Filed July 19, 1947

INVENTOR.
Donald J. Jordan

BY Charles A. Warren
ATTORNEY.

INVENTOR.
Donald J. Jordan

Patented Nov. 18, 1952

2,618,324

UNITED STATES PATENT OFFICE 2,618,324

POWER PLANT GOVERNOR

Donald J. Jordan, Milford, Conn., assignor to United Aircraft Corporation, East Hartford, Conn., a corporation of Delaware Application July 19, 1947, Serial No. 762,181

8 Claims. (Cl. 158—36.4)

1

This invention relates to a speed control or governor for a power plant and is particularly adapted for the control of a turbine driven by hot gas from a combustion chamber in which fuel is burned to provide the energy to drive the turbine.

The conventional flyball governor is well known for controlling power plant speeds but in certain instances is unsatisfactory by reason of the small forces available from the governor for the purpose of operating the power plant controls. This type of governor is also unsatisfactory in certain cases by reason of its low sensitivity at low speeds. A feature of this invention is a governing device which will provide large forces for operating a control such as the fuel valves by which to adjust the power input and therefore the speed of the power plant. Another feature is a governing device which will have the same sensitivity at all speeds.

One feature of the invention is a governing device which will provide a controlling force which is proportional to the amount of "offspeed," that is, the variation of the engine speed from the throttle setting, thereby assuring actuation of the controls to the extent necessary to restore the power plant to the predetermined speed. Another feature is a device requiring a minimum of expensive precision parts, thereby obtaining increased dependability of operation at a low cost.

Other objects and advantages will be apparent from the specification and claims and from the accompanying drawing which illustrate an embodiment of the invention.

Figure 1:
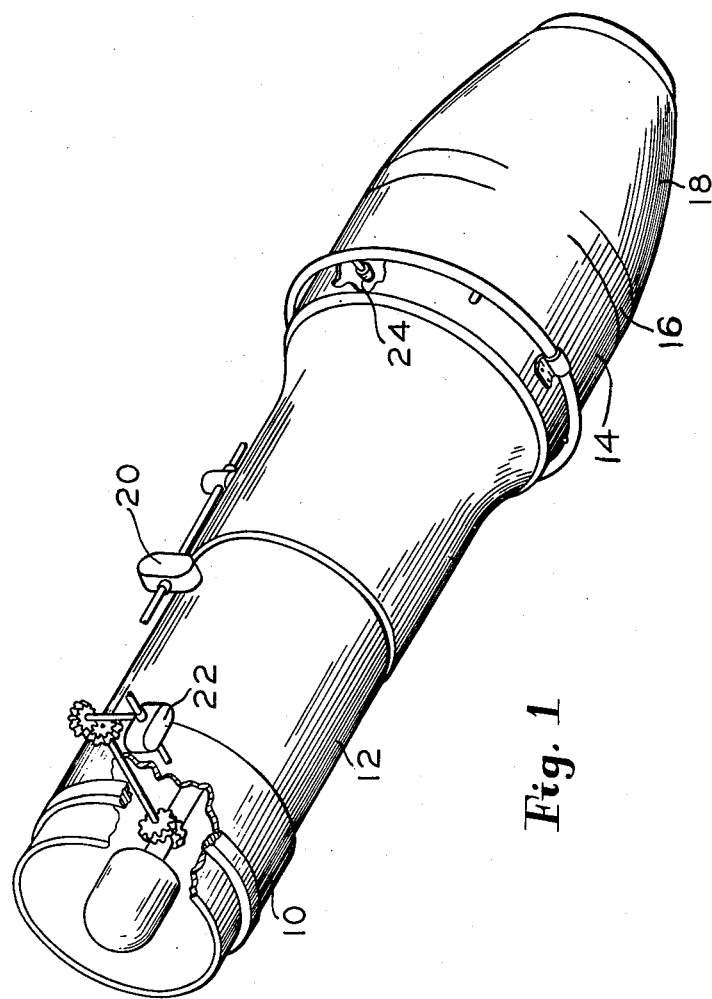
Fig. 1 is a perspective view of a power plant showing the governor control applied thereto.

The invention is shown in conjunction with a compressor-turbine power plant in which the power is delivered as a jet of hot gas through a thrust nozzle. As shown, the power plant includes an inlet duct 10 for air for a compressor 12 in which the air is compressed and from which air is delivered to one or more burners 14. Gas discharged from the burners supplies power to the turbine 16 which drives the compressor. Gas from the turbine is discharged through the thrust nozzle 18 for propulsive thrust. In addition to driving the compressor 12, the turbine may also drive accessories such as a gear pump 20 and, as will hereinafter appear, a governing pump 22.

Figure 2:
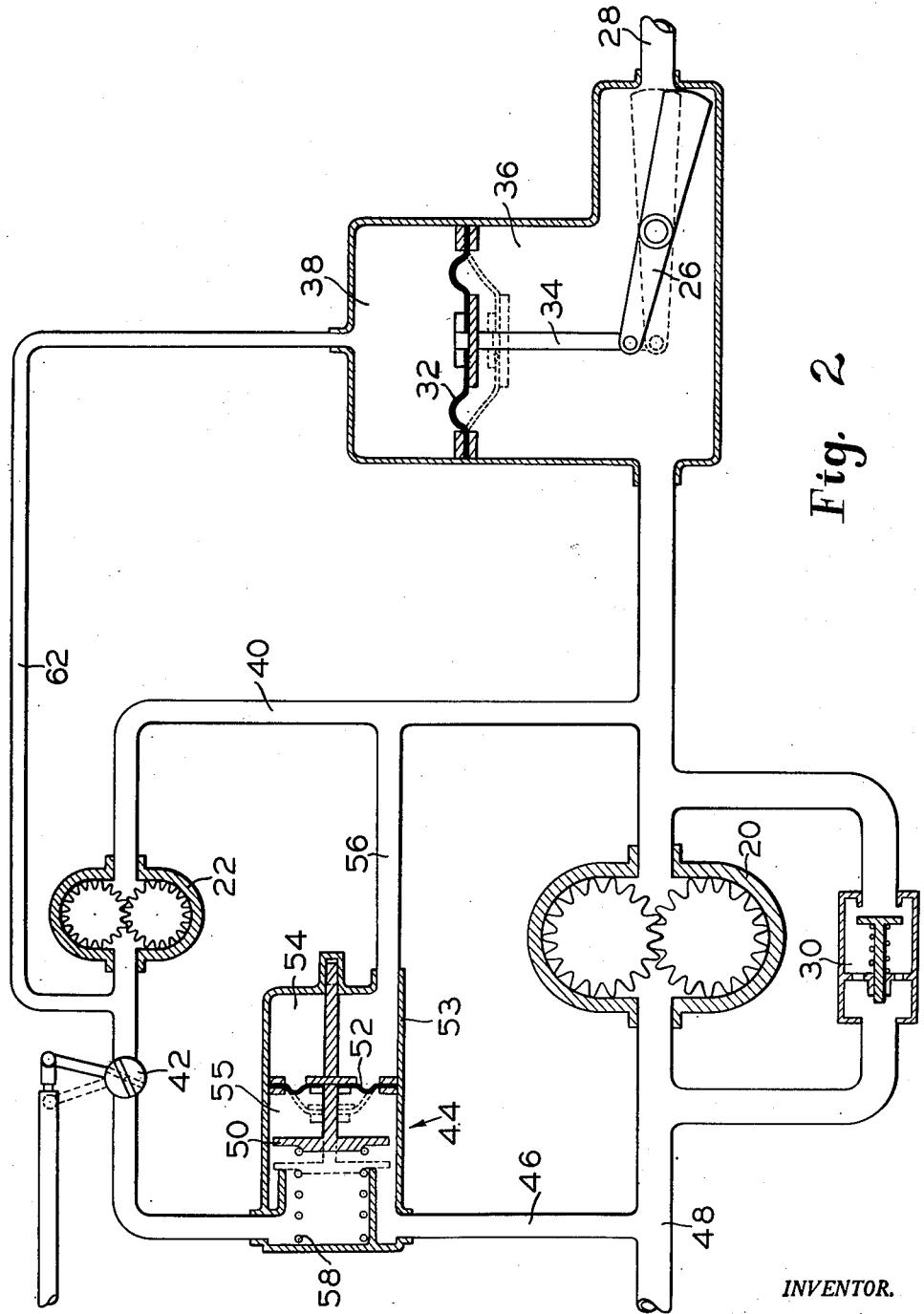
Fig. 2 is a diagrammatic layout of the control.

A power plant of this type may be controlled by adjusting the fuel quantity delivered to the nozzles 24 for the burner, and the speed of the turbine and compressor may be controlled by a governing device which adjusts the quantity of fuel. In accordance with this invention, fuel from the pump 20, Fig. 2, is delivered past a main fuel valve 26 to the conduit 28 leading to the nozzles 24. The delivery pressure from the gear pump may be controlled by a pressure regulator 30 so that the pressure of the fuel reaching the main fuel valve is maintained constant. The pump 20 and pressure regulator 30 constitute a constant pressure source of fuel.

The main fuel valve is actuated in response to pressure changes on the opposite sides of a diaphragm 32 connected as by a rod 34 to the valve. The chamber 36 at one side of the diaphragm 32 communicates with the fuel supply adjacent the inlet side of the main valve so that this side of the diaphragm is subjected to the constant pressure of the fuel. The other side of the diaphragm is a chamber 38 which communicates with the governing device, hereinafter described. As the pressure increases in chamber 38 above that of chamber 36, the main fuel valve tends to close and as the pressure in chamber 38 decreases below that in chamber 36, the main fuel valve is caused to open. The valve 26 and actuating mechanism is not spring loaded and can thus assume any position as determined by the pressure changes on the diaphragm.

The governing pump 22, directly geared to the power plant, has its inlet side connected, as by a conduit 40, to the discharge side of the main fuel pump 20, that is, the constant pressure source of fuel. The discharge of the governing pump is connected through a throttle valve 42 to a pressure regulator 44 from which the fuel from the governing pump may be returned by a conduit 46 to the fuel inlet conduit 48 for the main pump 20, the pump 22 and valve 42 being in series. The pressure regulator 44, which maintains a relatively high pressure on the fuel from the pump 22, consists of a valve 50 connected to a diaphragm 52 located in a casing 53 and forming chambers 54 and 55 on opposite sides of the diaphragm. Chamber 54 communicates by a conduit 56 to the conduit 40 so that the chamber 54 is at the same pressure as the discharge pressure from the main fuel pump 20, while the pressure in chamber 55 on the other side of diaphragm 52 is the same as the inlet to the main fuel pump. The pressure in chamber 54 acts to hold valve 50 closed against the pressure of spring 58 since the pressure in chamber 55 acts equally on valve 50 and diaphragm 52, its effect being balanced. The pressure regulator will, therefore, maintain a constant pressure difference between the inlet of the governing pump 22 and the discharge of the throttle valve 42.

The discharge side of the governing pump 22 also communicates, as by a conduit 62, to the chamber 38 at one side of the diaphragm 32 for the main fuel valve. The chamber 38 thus is subjected to the pressure existing between the throttle valve 42 and the pump 22, and this pressure changes when the throttle 42 is adjusted or when the rate of rotation of the power plant changes.

In operation, assuming that the throttle valve 42 is in a fixed position, the pressure difference across the diaphragm 32 of the main fuel valve will be zero only when the pressure drop across the throttle valve is equal to the pressure drop maintained by the governing pressure regulator, that is, when there is no pressure rise or drop across the governing pump 22. There is only one flow which will satisfy this condition so long as the throttle valve remains fixed and since the flow through the governing pump varies with its speed, there will be only one speed of the pump, and, therefore, of the turbine, which will satisfy the condition. The unit will accordingly be governed at this speed.

If the turbine, and therefore the governing pump 22, overspeeds, the pressure on the discharge side of the governing pump will increase and the main fuel valve will be moved by the increased pressure in chamber 32 so as to decrease the fuel flow. If the turbine, and therefore the governing pump 22, underspeeds, the pressure on the discharge side of the governing pump will decrease, thereby decreasing the pressure in chamber 38 and the fuel valve will be moved so as to increase the fuel flow.

If the throttle valve 42 is now moved manually in a clockwise direction, the pressure drop across the throttle valve is decreased, thereby reducing the pressure in the chamber 38 and causing the fuel valve 26 to open. As the turbine comes up to speed, by reason of the additional fuel, the higher rate of speed of the governing pump 22 restores the pressure in the chamber 38. The diaphragm 32 and valve 26, being free of springs, will move to and remain in each new setting as determined by the setting of the throttle valve. By proper selection of pressures in the governing system, and selection of suitable diaphragm areas, any necessary pressure may be provided for moving the valve 26.

It is to be understood that the invention is not limited to the specific embodiment herein illustrated and described, but may be used in other ways without departure from its spirit as defined by the following claims.

I claim:

1. A governor system for a power plant including a main fuel pump having a pressure regulator on the discharge side, a main fuel valve downstream of said pump, a diaphragm connected to said valve and directly subject on one side to the fuel pressure from the pump such that an increase of said pressure will tend to open said valve, a governing pump having its discharge connected to the other side of said diaphragm, and means for driving said governing pump at a speed proportional to power plant speed.

2. A governor system for a power plant including a main fuel pump having a pressure regulator on the discharge side, a main fuel valve downstream of said pump, a diaphragm connected to said valve and directly subject on one side to the fuel pressure from the pump such that an increase of said pressure will tend to open said valve, a governing pump having its discharge connected to the other side of said diaphragm and its inlet connected to the fuel supply from the main pump to the fuel valve, and means for driving said governing pump at a speed proportional to power plant speed.

3. A governor system for a power plant including a main fuel pump having a pressure regulator on the discharge side, a main fuel valve downstream of said pump, a diaphragm connected to said valve and directly subject on one side to the fuel pressure from the pump such that an increase of said pressure will tend to open said valve, a governing pump having its discharge connected to the other side of said diaphragm, a throttle valve for regulating governing pump discharge pressure, and means for driving said governing pump at a speed proportional to power plant speed.

4. A governor system for a power plant including a main fuel pump having a pressure regulator on the discharge side, a main fuel valve downstream of said pump, a diphragm connected to said valve and directly subject on one side to the fuel pressure from the pump such that an increase of said pressure will tend to open said valve, a governing pump having its discharge connected to the other side of said diaphragm, means for driving said governing pump at a speed proportional to power plant speed, a throttle valve for regulating governing pump discharge pressure, and means for maintaining a predetermined pressure drop across said governing pump and throttle valve.

5. A governor system for a power plant including a constant pressure source of fuel, a main fuel valve controlling fuel flow from said source, pressure responsive means for moving said main valve, a governing pump adapted to be driven by said power plant, a throttle valve in series with and downstream of said governing pump, means for maintaining a predetermined pressure drop across said pump and throttle valve, and a fluid connection from said governing pump to said pressure responsive means for causing opening or closing of said main valve in response to a decrease or an increase respectively of pump discharge pressure.

6. In a governing system for a power plant, a constant pressure source of fuel, a main valve controlling fuel flow from the source, a diaphragm connected to said valve, one side of said diaphragm being directly subject to pressure from said constant pressure source, a governing gear pump adapted to be driven by the power plant, a throttle valve in series with and on the discharge side of said governing pump, a fluid connection between the discharge side of said pump and the other side of said diaphragm such that an increase of governing pump discharge pressure will tend to close said main valve, and means for maintaining a constant pressure drop across the pump and throttle valve.

7. In a governing system for a power plant, a constant pressure source of fuel, a main valve controlling fuel flow from the source, a diaphragm connected to said valve, one side of said diaphragm being directly subject to pressure from said constant pressure source, a governing gear pump adapted to be driven by the power plant, a throttle valve in series with and on the discharge side of said governing pump, the inlet to said pump being connected to said constant pressure source, a fluid connection between the discharge side of said pump and the other side of said diaphragm such that an increase of governing pump discharge pressure will tend to close said main valve, and means for maintaining a constant pressure drop across the pump and throttle valve.

8. In a governing system for a power plant, a constant pressure source of fuel, a main valve controlling fuel flow from the source, pressure responsive means connected to said valve, a direct connection from said constant pressure source to one side of said pressure responsive means, a governing gear pump adapted to be driven by the power plant, a throttle valve in series with and on the discharge side of said governing pump, a fluid connection between the discharge side of said pump and the other side of said pressure responsive means such that an increase of governing pump discharge pressure will tend to close said main valve, and means for maintaining a constant pressure drop across the pump and throttle valve.

DONALD J. JORDAN.

REFERENCES CITED

The following references are of record in the file of this patent:

UNITED STATES PATENTS

| Number | Name | Date |
|---|---|---|
| 1,571,977 | Trotter | Feb. 9, 1926 |
| 2,291,011 | Vickers | July 28, 1942 |
| 2,345,297 | Schwendner | Mar. 28, 1944 |
| 2,369,397 | Kostenick | Feb. 13, 1945 |
| 2,407,115 | Udale | Sept. 3, 1946 |
| 2,443,527 | Wirth | June 15, 1948 |
| 2,452,627 | Barford et al. | Nov. 2, 1948 |